(12) United States Patent
Lee et al.

(10) Patent No.: US 10,466,750 B2
(45) Date of Patent: Nov. 5, 2019

(54) ELECTRONIC DEVICE

(71) Applicants: Nien-Chen Lee, Taipei (TW);
 Tzu-Chien Lai, Taipei (TW);
 Yen-Hsiao Yeh, Taipei (TW)

(72) Inventors: Nien-Chen Lee, Taipei (TW);
 Tzu-Chien Lai, Taipei (TW);
 Yen-Hsiao Yeh, Taipei (TW)

(73) Assignee: COMPAL ELECTRONICS, INC.,
 Taipei (TW)

( * ) Notice: Subject to any disclaimer, the term of this patent is extended or adjusted under 35 U.S.C. 154(b) by 0 days.

(21) Appl. No.: 16/231,252

(22) Filed: Dec. 21, 2018

(65) Prior Publication Data

US 2019/0196553 A1 Jun. 27, 2019

Related U.S. Application Data

(60) Provisional application No. 62/610,279, filed on Dec. 26, 2017.

(51) Int. Cl.
 *G06F 1/16* (2006.01)
 *F16C 11/04* (2006.01)
 *G06F 1/20* (2006.01)

(52) U.S. Cl.
 CPC ............ *G06F 1/1681* (2013.01); *F16C 11/04* (2013.01); *G06F 1/1616* (2013.01); *G06F 1/1688* (2013.01); *G06F 1/203* (2013.01)

(58) Field of Classification Search
 None
 See application file for complete search history.

(56) References Cited

U.S. PATENT DOCUMENTS 5,818,360 A * 10/1998 Chu .................. G06F 1/1616
 341/22
5,917,695 A 6/1999 Youn
6,392,871 B1 * 5/2002 Yanase ................. G06F 1/162
 345/905

(Continued)

FOREIGN PATENT DOCUMENTS

CN 201475151 5/2010
CN 102469379 5/2012

(Continued)

OTHER PUBLICATIONS

"Office Action of Taiwan Counterpart Application," dated Aug. 23, 2019, pp. 1-6.

*Primary Examiner* — Xanthia C Cunningham
(74) *Attorney, Agent, or Firm* — JCIPRNET (57) ABSTRACT

An electronic device includes a first body, a second body, a function module and a driving module. The second body is pivoted to the first body. The function module is pivoted to the first body and located between the first body and the second body. The driving module is at least disposed at the first body and the function module. When the first body is closed to the second body, the function module is located at an original position relative to the second body, and the function module is exposed from the first body. When the first body is rotated in a first clock direction to a first angle relative to the second body, the function module is driven by the driving module so as to rotate in a second clock direction to a second angle relative to the second body, and the first angle is greater than the second angle.

13 Claims, 13 Drawing Sheets

(56) References Cited

U.S. PATENT DOCUMENTS

| | | | | |
|---|---|---|---|---|
| 6,392,877 | B1* | 5/2002 | Iredale | G06F 1/1616 248/551 |
| 6,430,038 | B1* | 8/2002 | Helot | G06F 1/1616 248/917 |
| 6,612,668 | B2* | 9/2003 | Doan | G06F 1/1616 16/303 |
| 6,816,365 | B2* | 11/2004 | Hill | G06F 1/1616 341/22 |
| 7,630,195 | B2* | 12/2009 | Lin | G06F 1/203 361/679.26 |
| 8,520,382 | B2* | 8/2013 | Tye | G06F 1/203 248/685 |
| 8,542,486 | B2* | 9/2013 | Lin | G06F 1/203 174/547 |
| 8,582,797 | B2 | 11/2013 | Wang | |
| 8,792,231 | B2* | 7/2014 | Derryberry | H04M 1/0247 361/679.08 |
| 9,167,711 | B2* | 10/2015 | Lee | G06F 1/1654 |
| 9,253,903 | B2* | 2/2016 | Kawada | G06F 1/1618 |
| 10,114,425 | B2* | 10/2018 | Lam | G06F 1/1616 |
| 10,289,176 | B1* | 5/2019 | Chen | G06F 1/203 |
| 2011/0122555 | A1* | 5/2011 | Yeh | G06F 1/1616 361/679.01 |
| 2011/0194238 | A1* | 8/2011 | Song | G06F 1/1616 361/679.08 |
| 2013/0128442 | A1* | 5/2013 | Tseng | G06F 1/1616 361/679.09 |
| 2014/0247551 | A1* | 9/2014 | Xia | G06F 1/1632 361/679.43 |
| 2014/0321038 | A1* | 10/2014 | Park | G06F 1/1681 361/679.09 |
| 2014/0375194 | A1* | 12/2014 | Arima | G06F 1/1616 312/322 |
| 2015/0002998 | A1* | 1/2015 | Arima | G06F 1/1637 361/679.27 |
| 2015/0192966 | A1* | 7/2015 | Kim | G06F 1/1681 361/679.28 |
| 2016/0306385 | A1* | 10/2016 | Chen | G06F 1/1616 |
| 2016/0327994 | A1* | 11/2016 | Lee | G06F 1/1618 |

FOREIGN PATENT DOCUMENTS

| | | |
|---|---|---|
| CN | 104486704 | 4/2015 |
| CN | 104902380 | 9/2015 |
| CN | 205899443 | 1/2017 |
| TW | M263538 | 5/2005 |
| TW | 1505067 | 10/2015 |
| TW | 1544157 | 8/2016 |
| TW | M578813 | 6/2019 |

* cited by examiner

ELECTRONIC DEVICE

CROSS-REFERENCE TO RELATED APPLICATION

This application claims the priority benefit of U.S. provisional application Ser. No. 62/610,279, filed on Dec. 26, 2017. The entirety of the above-mentioned patent application is hereby incorporated by reference herein and made a part of this specification.

BACKGROUND OF THE DISCLOSURE

Field of the Disclosure

The present disclosure relates to an electronic device, and more particularly to an electronic device having a function module that is independent of two bodies.

Description of Related Art

With the advancement of technology, electronic devices have become quite popular. In the case of a notebook computer, a speaker is typically disposed on the lower body so the user can play audio while operating the notebook computer. However, if the user does not need to use the screen and closes the upper body on the lower body, since the speaker is covered by the upper body, even if the notebook computer is set to play the music continuously, it is still difficult for such notebook computer to maintain good playback quality.

SUMMARY OF THE DISCLOSURE

The disclosure provides an electronic device, in which the function module is exposed without being covered and the function is executable under different states of use.

An electronic device of the present disclosure includes a first body, a second body, a function module, and a driving module. The second body is pivoted to the first body. The function module is pivoted to the first body and located between the first body and the second body. The driving module is at least disposed at the first body and the function module. When the first body is closed to the second body, the function module is located at an original position relative to the second body, and the function module is exposed from the first body. When the first body is flipped over in a first clock direction to a first angle relative to the second body, the function module is driven by the driving module so as to flip over in a second clock direction to a second angle relative to the second body, and the first angle is greater than the second angle.

In an embodiment of the disclosure, the driving module includes a first magnetic member, a second magnetic member and a third magnetic member. The first magnetic member is disposed on the first body, the second magnetic member is disposed on the function module, and the third magnetic member is disposed on the second body. When the first body is closed to the second body, the second magnetic member is attracted by the first magnetic member to cause the function module to stay at the original position. When the first body is flipped over relative to the second body, the first magnetic member is away from the second magnetic member, and the second magnetic member is attracted by the third magnetic member to rotate the function module.

In an embodiment of the disclosure, the function module includes a function module rotating shaft, and the first body includes a first body rotating shaft, and the function module rotating shaft is coaxial with the first body rotating shaft.

In an embodiment of the disclosure, the driving module includes a driving wire, a driven wheel and an extending arm. The extending arm is fixed to the function module and is in different axis than the function module rotating shaft. The driving wire bypasses the driven wheel and the both ends thereof are respectively fixed to the first body rotating shaft and the extending arm. The driving wire includes a first segment between the first body rotating shaft and the driven wheel and a second segment between the driven wheel and the extending arm, and the extending direction of the first segment is different from the extending direction of the second segment. When the first body rotating shaft is rotated in the first clock direction, the driving wire pulls the extension arm such that the function module is rotated around the function module rotating axis in the second clock direction.

In an embodiment of the disclosure, the extending arm is integral with the function module rotating shaft, and the extending arm is parallel to the function module rotating shaft.

In an embodiment of the disclosure, the extending arm is closer to the second body than the function module rotating shaft, and the driven wheel is located under the extending arm.

In an embodiment of the disclosure, the driving module includes a first gear fixed to the first body rotating shaft, a second gear engaged with the first gear, and a cam fixed to the second gear. The function module includes an inner inclined surface. The cam abuts against the inner inclined surface. When the first body is flipped over relative to the second body in the first clock direction, the cam is rotated and pushes the inner inclined surface, so that the function module is rotated in the second clock direction.

In an embodiment of the disclosure, the electronic device further includes a function module base disposed between the first body and the second body, and the function module is rotatably disposed on the function module base. The driving module further includes a torsion spring connected between the function module and the function module base.

In an embodiment of the present disclosure, the electronic device further includes a function module base disposed adjacent to the second body and fixed to the second body. The function module base includes a plurality of heat dissipation holes, and the function module is rotatably disposed on the function module base. When the function module is at the original position, the function module covers at least some of the heat dissipation holes, and when the function module is rotated to the second angle in the second clock direction, the function module exposes the heat dissipation holes.

In an embodiment of the disclosure, the first body includes a notch on a side close to the first body rotating shaft. The function module is located in the notch, and the function module is conformed to the notch.

In an embodiment of the disclosure, when the first body is closed to the second body, the function module is flush with the outer surface of the first body.

In an embodiment of the disclosure, the function module includes at least one of a speaker, a display, an input device, and a sound receiver.

In an embodiment of the disclosure, the first angle is between 120 degrees and 150 degrees, and the second angle is between 15 degrees and 35 degrees.

Based on the above, the function module of the electronic device of the present disclosure is pivoted to the first body and located between the first body and the second body, and the driving module is at least disposed at the first body and the function module. When the first body is closed to the second body, the function module is exposed from the first body. When the first body is flipped over in the first clock direction, the function module is driven by the driving module to be flipped over to a smaller angle in the second clock direction, so that the function module is adapted to face the user. That is to say, the function module exhibits an exposed state regardless of whether the first body of the electronic device of the present disclosure is closed to or is flipped over from the second body, which enables the function module to perform functions well.

In order to make the aforementioned features and advantages of the disclosure more comprehensible, embodiments accompanying figures are described in detail below.

DESCRIPTION OF EMBODIMENTS

Figure 1:
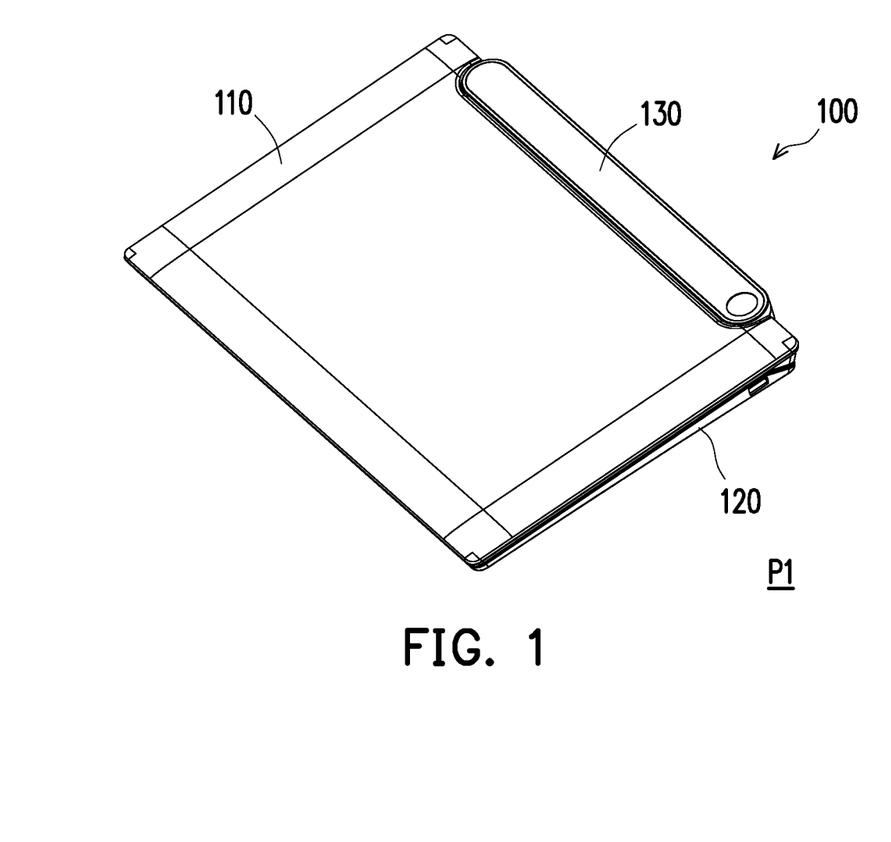
FIG. 1 is a schematic view of an electronic device at an original position according to the first embodiment of the present disclosure.
Figure 2:
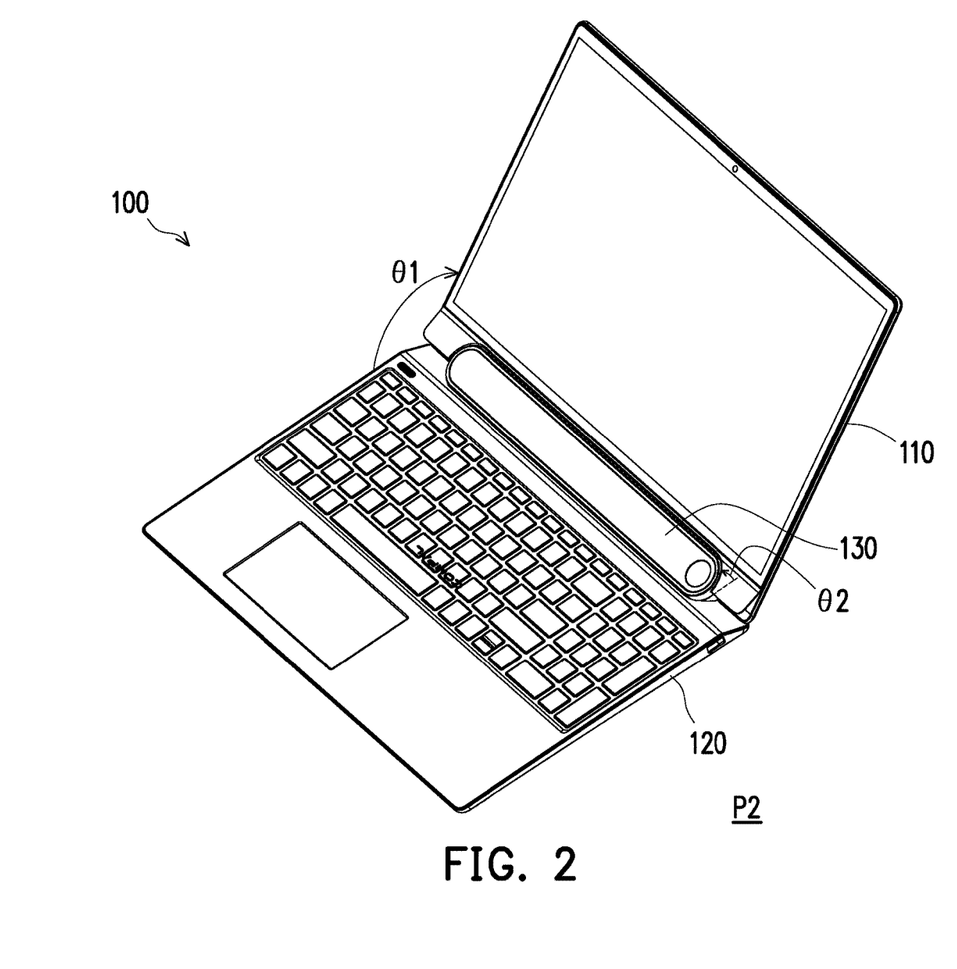
FIG. 2 is a schematic view showing a first body of the electronic device of FIG. 1 flipped over from the second body.

FIG. 1 is a schematic view of an electronic device at an original position according to the first embodiment of the present disclosure. FIG. 2 is a schematic view showing a first body of the electronic device of FIG. 1 flipped over from the second body. Referring to FIG. 1 and FIG. 2, the electronic device 100 of the embodiment includes a first body 110, a second body 120, and a function module 130. In the embodiment, the first body 110 is, for example, a body having a screen, and the second body 120 is, for example, a body having an input device such as a keyboard. The function module 130 includes at least one of a speaker, a display, an input device, and a sound receiver. The display is, for example, a display that displays a number, and may also be an LCD or the like. The input device is, for example, a touch panel or a physical button. Certainly, the type of the function module 130 is not limited thereto.

In this embodiment, the second body 120 is pivoted to the first body 110. The function module 130 is pivoted to the first body 110 and located between the first body 110 and the second body 120. As shown in FIG. 1, when the first body 110 is closed to the second body 120, the function module 130 is located at the original position P1 relative to the second body 120, and the function module 130 is exposed from the first body 110. As can be seen from FIG. 2, when the first body 110 is flipped over to the first angle θ1 relative to the second body 120 in a first clock direction (for example, clockwise direction), the function module 130 is rotated to the second angle θ2 relative to the second body 120 in a second clock direction (for example, counterclockwise direction), and the first angle θ1 is greater than the second angle θ2. In the present embodiment, the first angle θ1 is, for example, between 120 degrees and 150 degrees, and the second angle θ2 is, for example, between 15 degrees and 35 degrees. The first angle θ1 is, for example, 135 degrees, and the second angle θ2 is, for example, 23 degrees. Certainly, the range of the first angle θ1 and the second angle θ2 is not limited thereto.

The function module 130 is exemplified as a speaker. In the embodiment, when the first body 110 is closed to the second body 120, since the function module 130 is exposed from the first body 110, the function module 130 is not blocked by other machine bodies when playing audio, thereby providing good playback quality. When the user flips the first body 110 over at a large angle to the flipping position P2 (which is exemplified as the working position of conventional notebook computer in the present embodiment), the function module 130 is slightly flipped over and turned to the user. In this manner, the function module 130 is capable of playing audio in the direction facing the user, and thus providing good playback quality.

Similarly, when the function module 130 includes the display, if the first body 110 is closed to the second body 120, since the function module 130 is exposed from the first body 110, the user can still see the information (for example, time, message notification, etc.) on the display. When the user flips the first body 110 over to the flipping position P2, the electronic device 100 not only has a screen on the first body 110, but the function module 130 can also display the information, thereby providing the user with versatile display effects.

Certainly, if the function module 130 has a combination of a speaker and a display, the function module 130 can provide good audio and visual effects to the user no matter whether the first body 110 is closed to or is flipped over from the second body 120.

It will be described below how the function module 130 is rotated to the second angle θ2 relative to the second body 120 in the second clock direction when the first body 110 is flipped over to the first angle θ1 relative to the second body 120 in the first clock direction.

Figure 3:
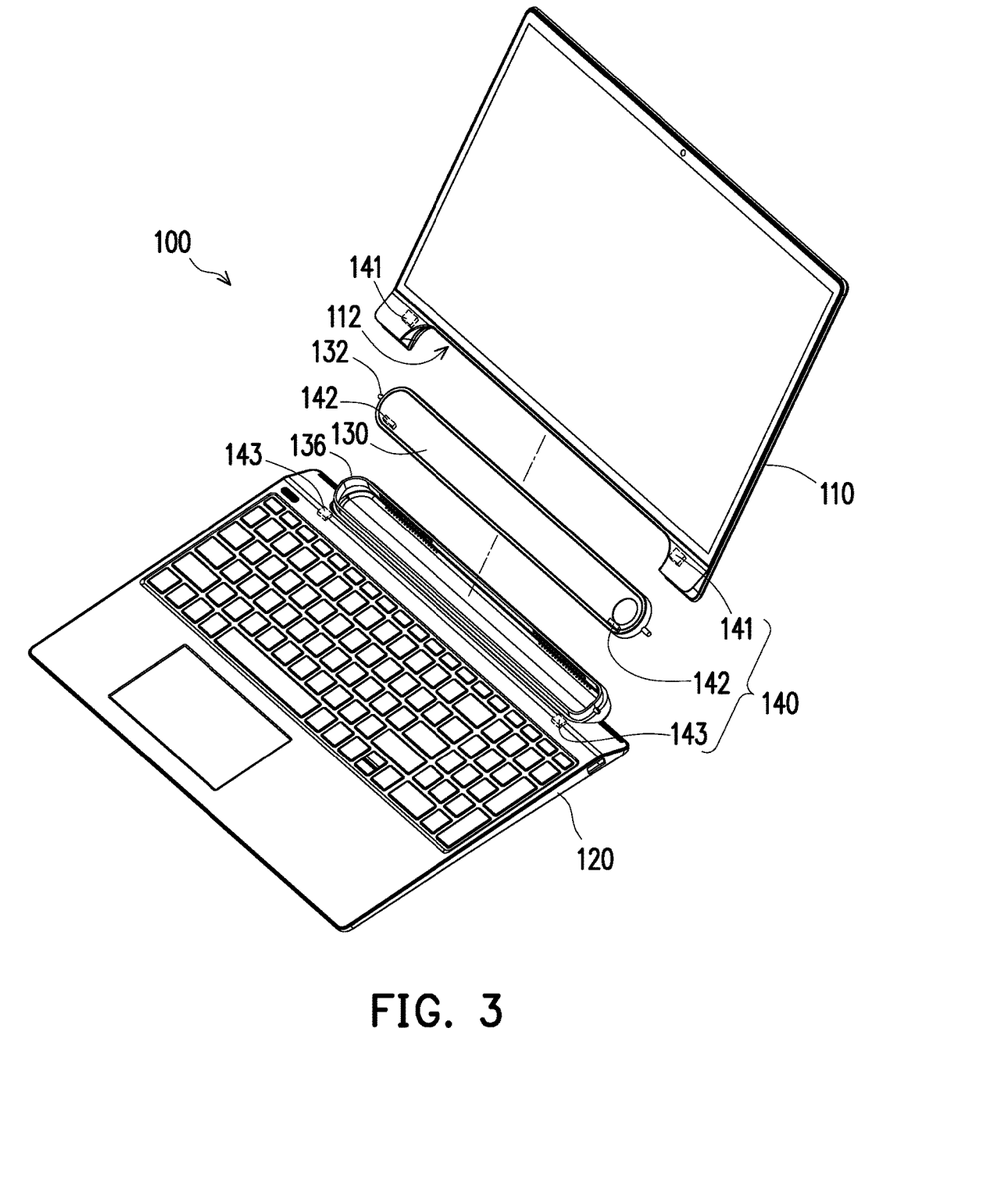
FIG. 3 is a schematic exploded view of a third body of the electronic device of FIG. 2.
Figure 4:
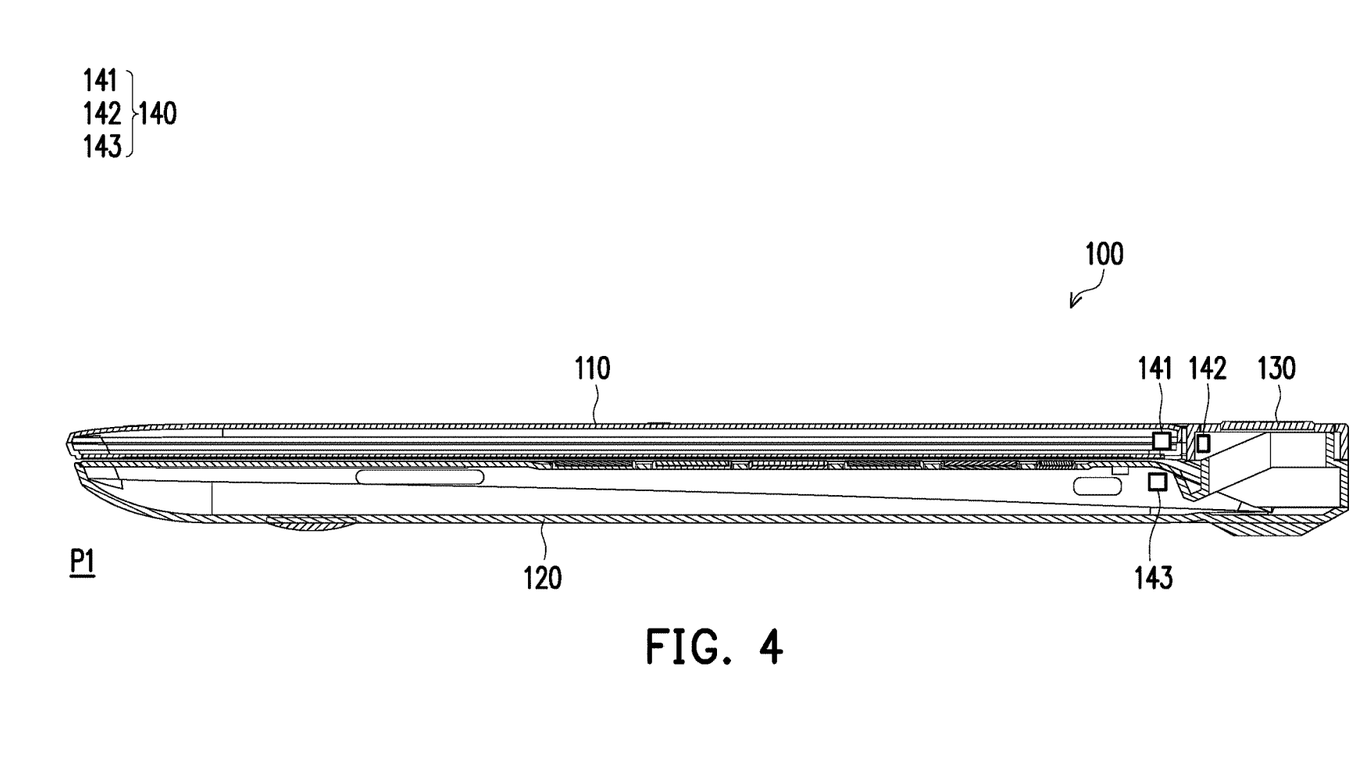
FIG. 4 is a schematic cross-sectional view of FIG. 1.
Figure 5:
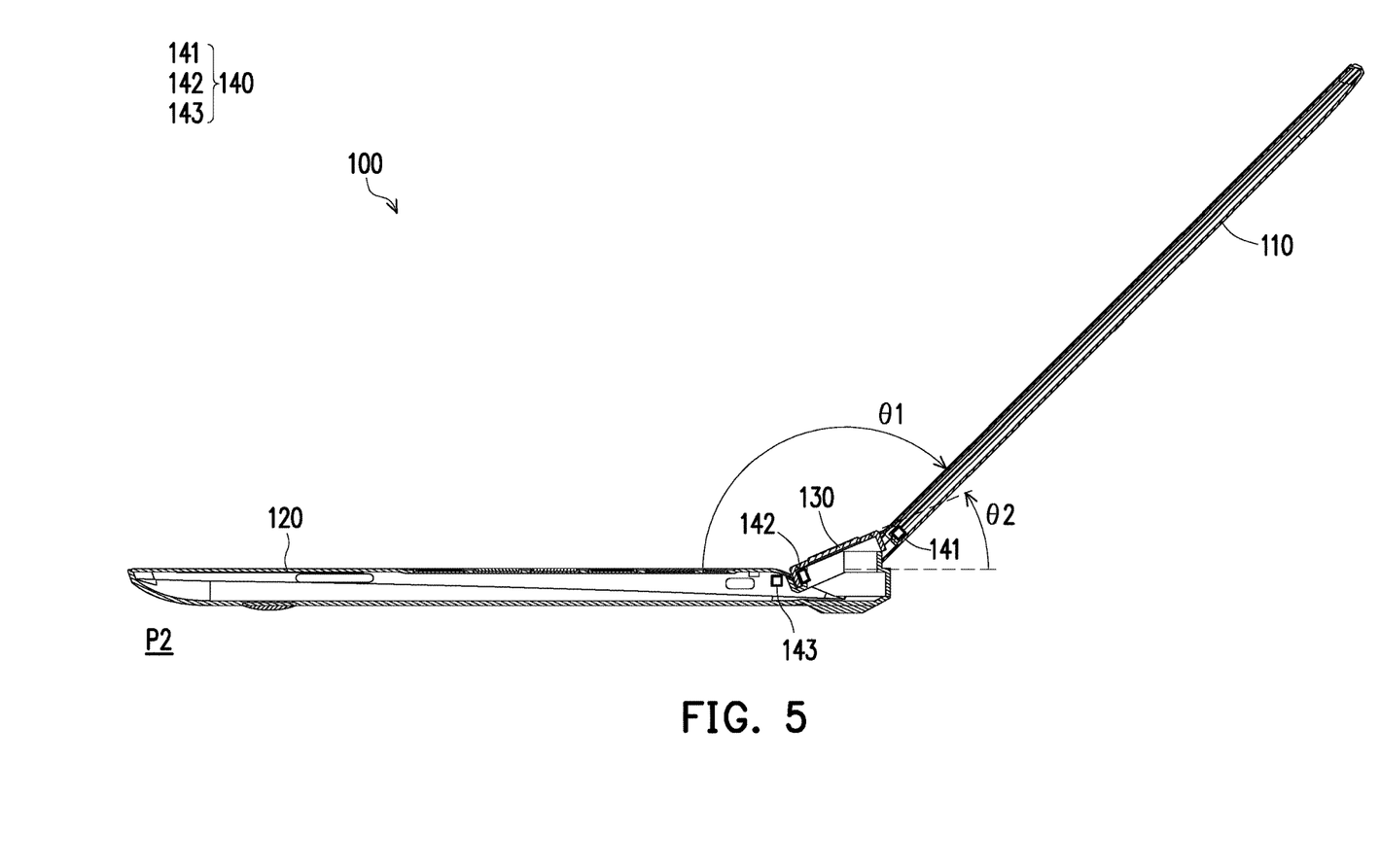
FIG. 5 is a schematic cross-sectional view of FIG. 2.

FIG. 3 is a schematic exploded view of a third body of the electronic device of FIG. 2. FIG. 4 is a schematic cross-sectional view of FIG. 1. FIG. 5 is a schematic cross-sectional view of FIG. 2. Referring to FIG. 3 to FIG. 5, the electronic device 100 of the embodiment includes a driving module 140. The driving module 140 is at least disposed at the first body 110 and the function module 130. In this embodiment, the driving module 140 includes a first magnetic member 141, a second magnetic member 142, and a third magnetic member 143. The first magnetic member 141 is disposed on the first body 110, the second magnetic member 142 is disposed on the function module 130, and the third magnetic member 143 is disposed on the second body 120.

As shown in FIG. 4, when the first body 110 is closed to the second body 120, the second magnetic member 142 is attracted by the first magnetic member 141 to cause the function module 130 to stay at the original position P1. As shown in FIG. 5, when the first body 110 is flipped over relative to the second body 120, the first magnetic member 141 is away from the second magnetic member 142, and the second magnetic member 142 is attracted by the third magnetic member 143 to enable the function module 130 to rotate, such that the function module 130 is driven by the driving module 140 to rotate to the second angle θ2 relative to the second body 120 in the second clock direction.

Figure 6:
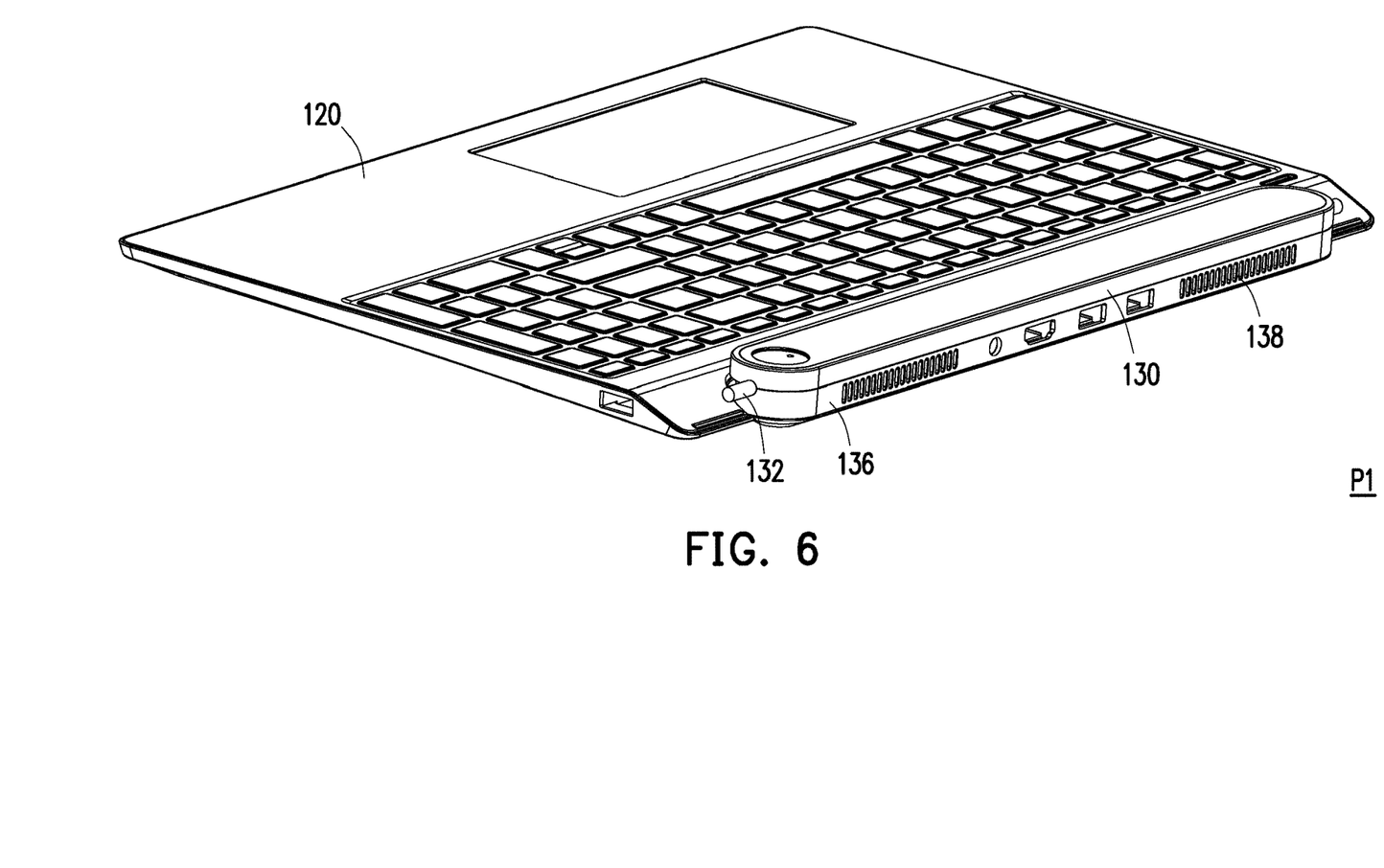
FIG. 6 is a schematic view of a third body of the electronic device of FIG. 1 not yet flipped over from the second body.
Figure 7:
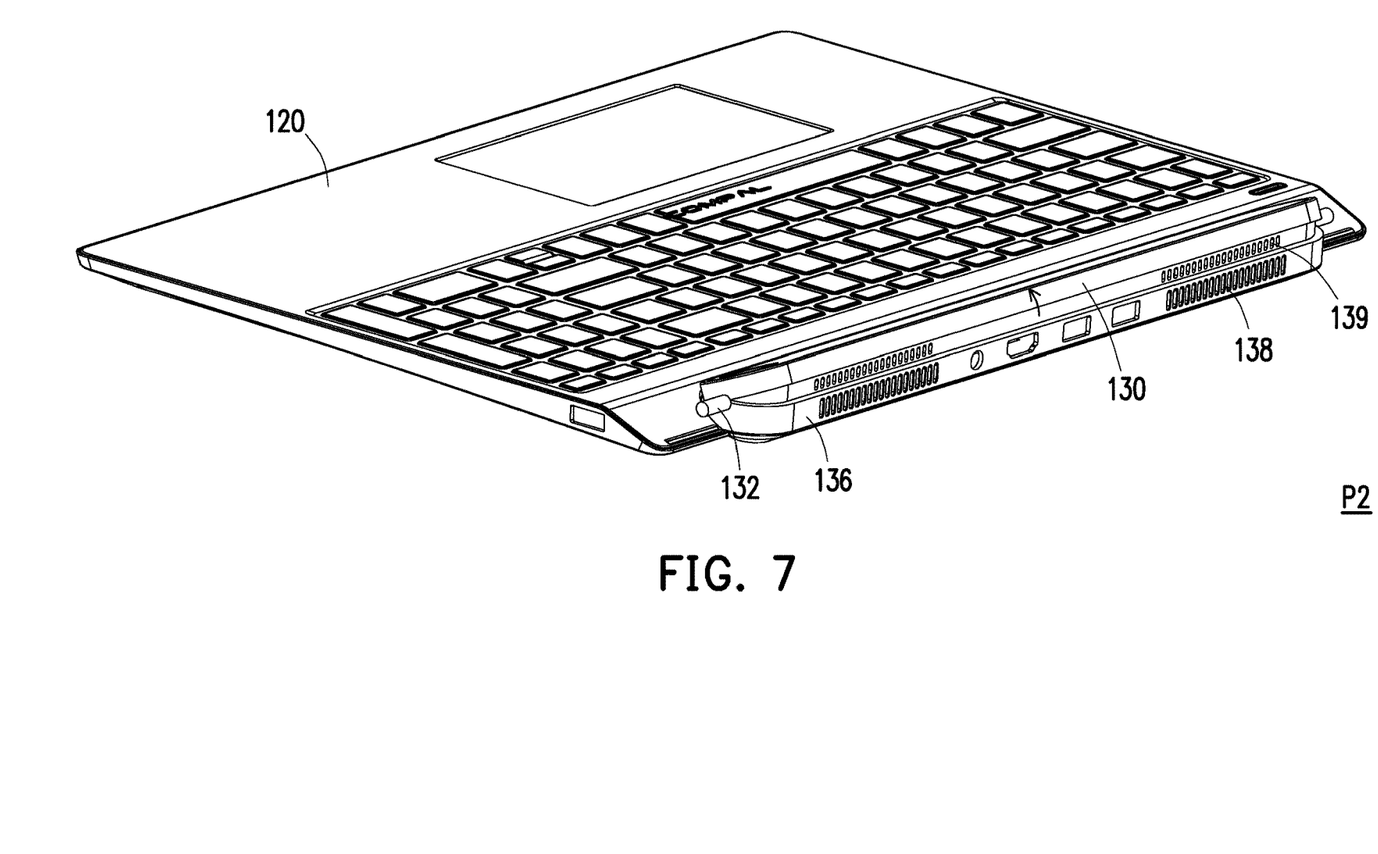
FIG. 7 is a schematic view of the third body of the electronic device of FIG. 1 flipped over from the second body.

FIG. 6 is a schematic view of a third body of the electronic device of FIG. 1 not yet flipped over from the second body. FIG. 7 is a schematic view of the third body of the electronic device of FIG. 1 flipped over from the second body. Referring to FIG. 3, FIG. 6 and FIG. 7, in the embodiment, the electronic device 100 further includes a function module base 136, which is located next to the second body 120 and is fixed to the second body 120. The function module base 136 includes multiple heat dissipation holes 138, 139 (FIG. 7). In this embodiment, the function module base 136 includes two rows of heat dissipation holes 138, 139. The function module 130 is rotatably disposed on the function module base 136. When the function module 130 is located at the original position P1, the function module 130 covers the upper row of the heat dissipation holes 139, and when the function module 130 is rotated to the second angle θ2 in the second clock direction, the function module 130 exposes the upper row of the heat dissipation holes 139.

In this embodiment, when the electronic device 100 is at the original position P1, since the upper row of the heat dissipation holes 139 of the function module base 136 is covered, the probability that external dust or foreign matter enters the function module 130 and the function module base 136 can be lowered. In addition, when the electronic device 100 is at the flipping position P2, since the upper row of the heat dissipation holes 139 of the function module base 136 is exposed, the heat dissipation efficiency of the function module 130 can be improved.

In addition, referring back to FIG. 3, in the embodiment, the first body 110 includes a notch 112 on a side close to the first body rotating shaft 114, the function module 130 is located in the notch 112, and the function module 130 is conformal to the notch 112. Therefore, as shown in FIG. 1 and FIG. 2, no matter whether the first body 110 is closed to or is flipped over from the second body 120, the function module 130 and the first body 110 maintain an intact and beautiful appearance. In addition, as shown in FIG. 4, when the first body 110 is closed to the second body 120, the function module 130 is flush with the outer surface of the first body 110. That is, the upper surface of the function module 130 is almost in the same plane as the outer surface of the first body 110. Similarly, such design allows the machine body (the first body 110 and the function module 130) located at the upper position maintains a consistent and beautiful appearance when the electronic device 100 is at the original position P1.

Other aspects of the driving module will be described below. In the following embodiments, the same or similar elements described in the previous embodiment are denoted by the same or similar symbols. Meanwhile, only the main differences are explained, and the remaining components are not described in details.

Figure 8:
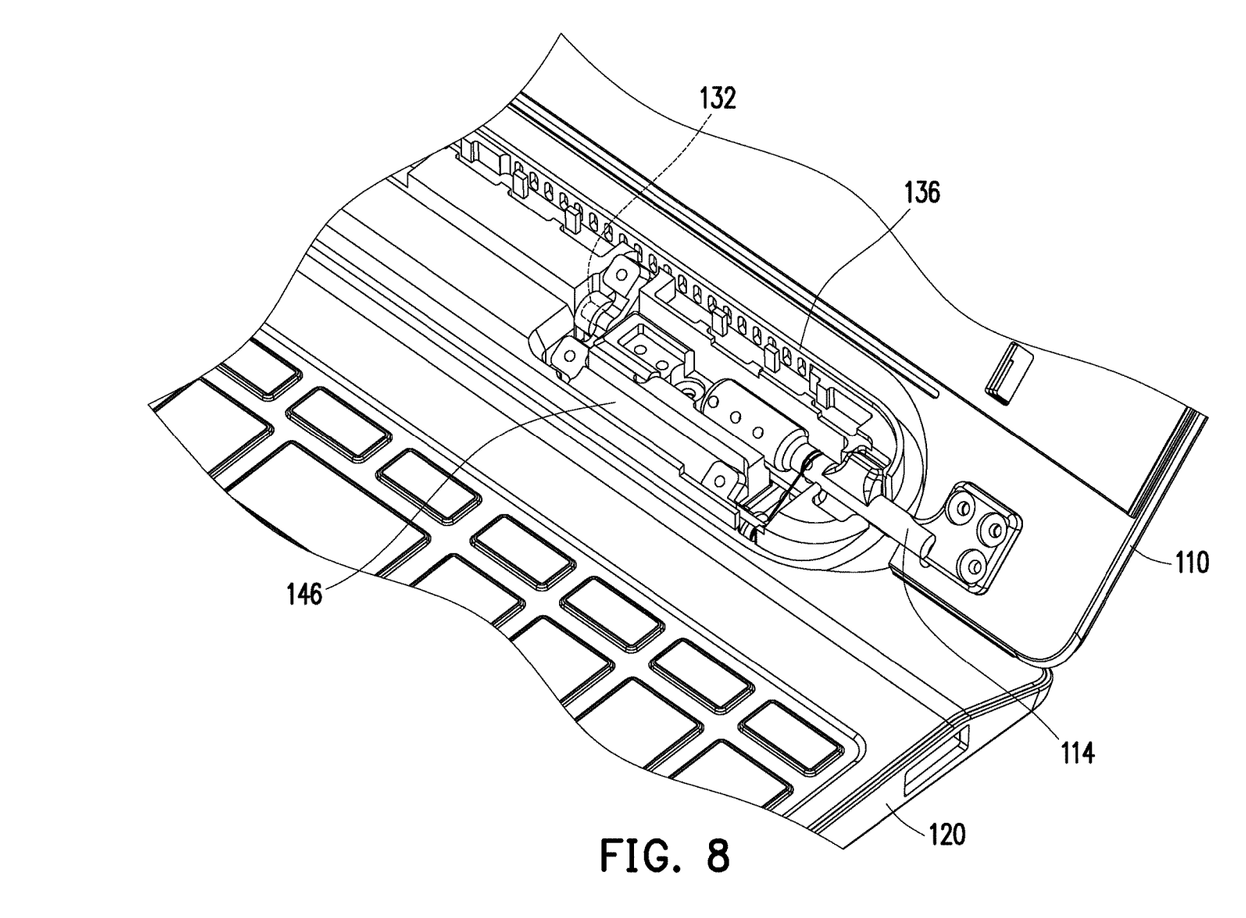
FIG. 8 is a schematic partial internal view of an electronic device according to a second embodiment of the present disclosure.
Figure 9:
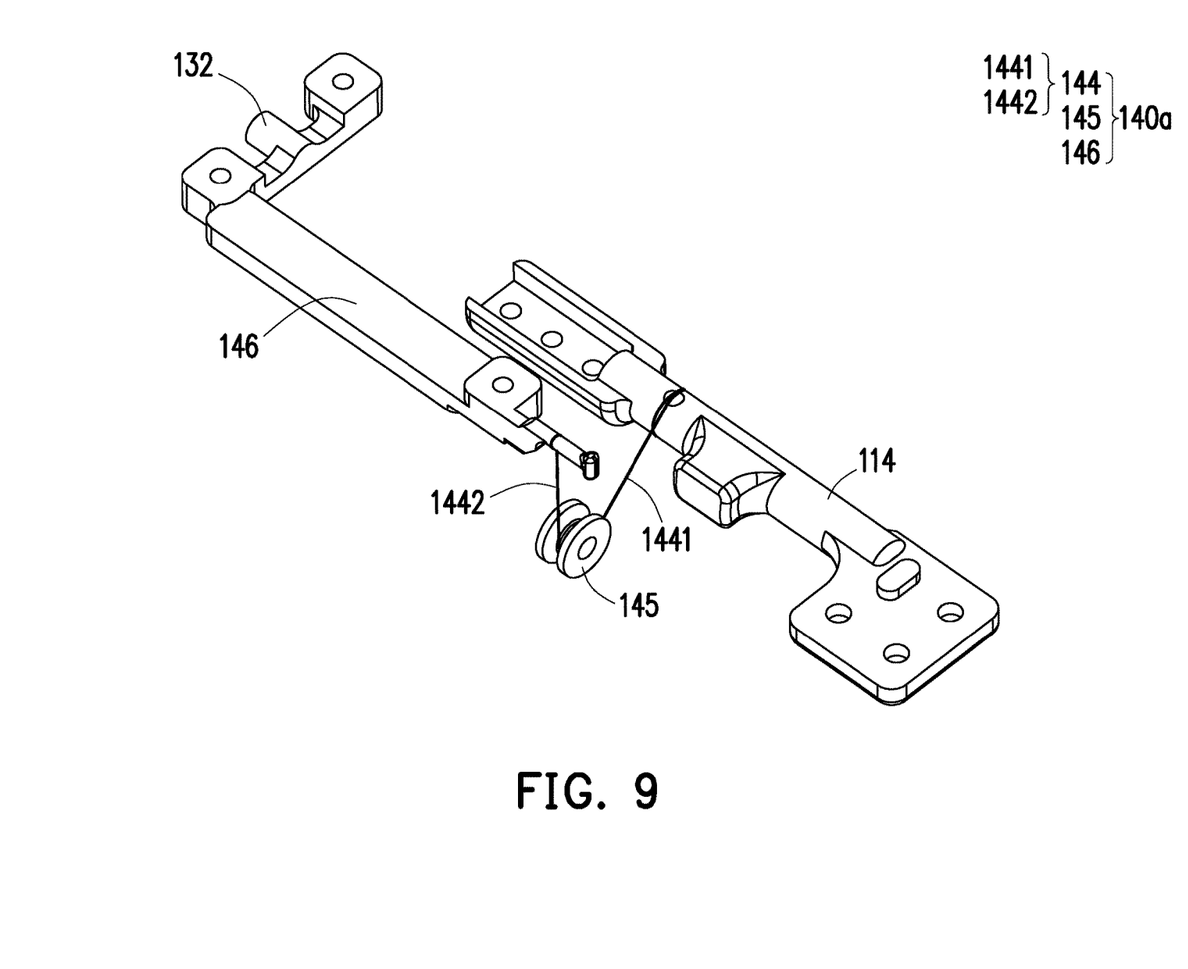
FIG. 9 is a schematic view of a driving module of the electronic device of FIG. 8.
Figure 10:
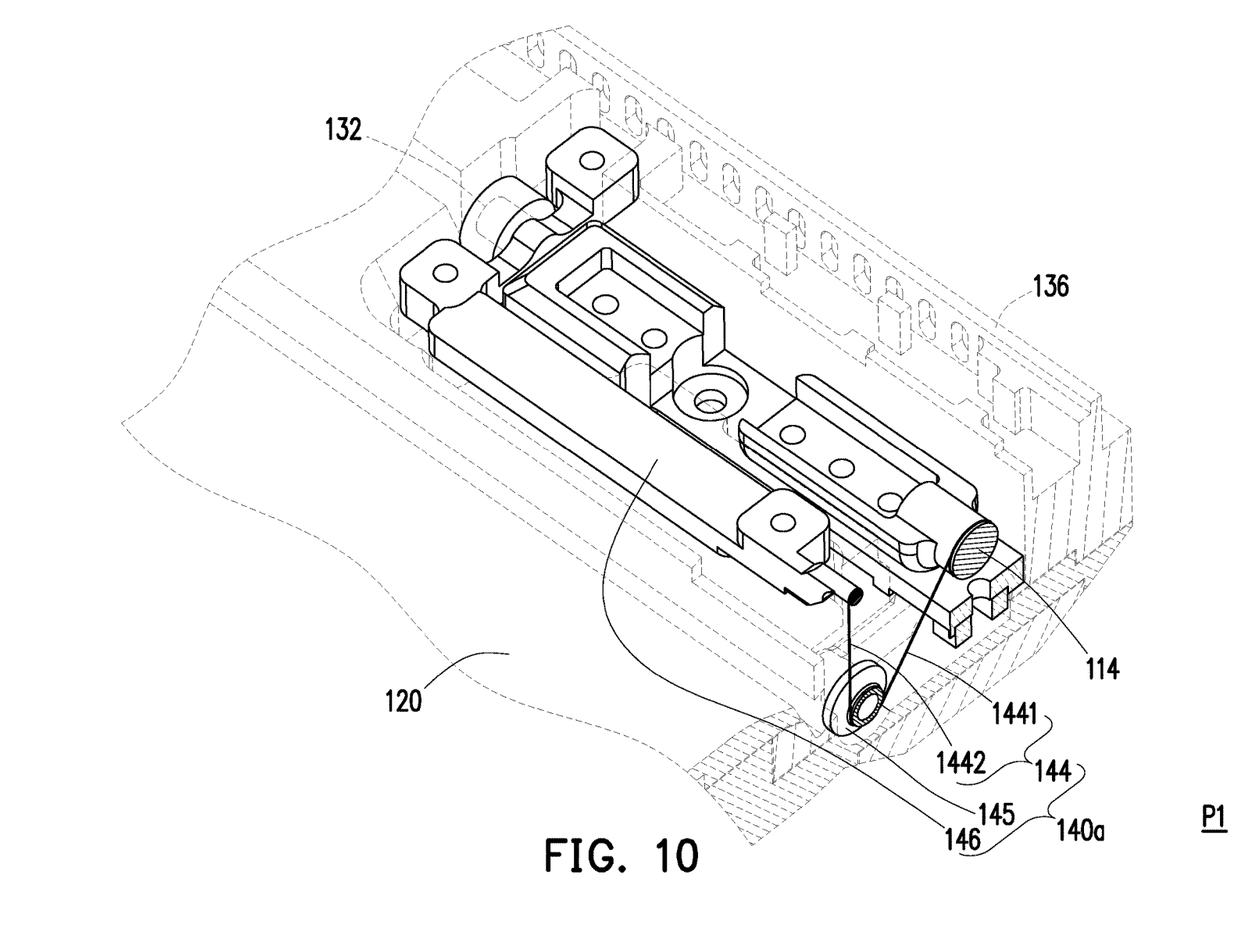
FIG. 10 is a schematic partial cross-sectional view showing the driving module of the electronic device of FIG. 8 at an original position.
Figure 11:
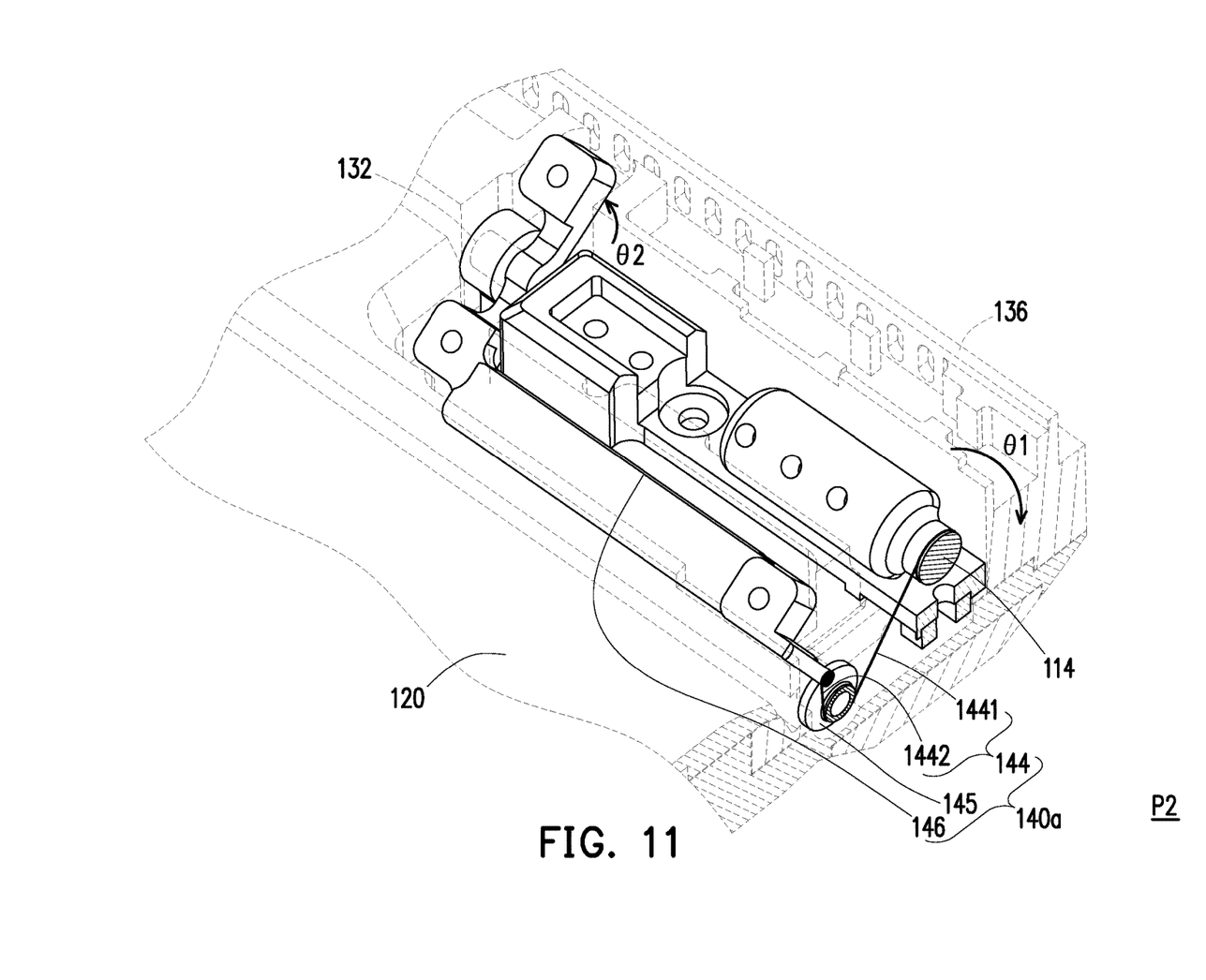
FIG. 11 is a schematic partial cross-sectional view showing the driving module of the electronic device of FIG. 8 at a flipping position.

FIG. 8 is a schematic partial internal view of an electronic device according to a second embodiment of the present disclosure. FIG. 9 is a schematic view of a driving module of the electronic device of FIG. 8. FIG. 10 is a schematic partial cross-sectional view showing the driving module of the electronic device of FIG. 8 at an original position. FIG. 11 is a schematic partial cross-sectional view showing the driving module of the electronic device of FIG. 8 at a flipping position.

Referring to FIG. 8 to FIG. 11, in the embodiment, the function module 130 includes the function module rotating shaft 132 (FIG. 9). The first body 110 includes a first body rotating shaft 114 (FIG. 9), and the function module rotating shaft 132 and the first body rotating shaft 114 are coaxial. The driving module 140a includes a driving wire 144, a driven wheel 145 and an extending arm 146. The extending arm 146 is fixed to the function module 130 and is in different axis than the function module rotating shaft 132. As can be seen from FIG. 9, in the present embodiment, the extending direction of the extending arm 146 is parallel to the function module rotating shaft 132, but the extending arm 146 is in different axis than the function module rotating shaft 132. In addition, in the embodiment, the extending arm 146 is integrally formed on the function module rotating shaft 132. However, in other embodiments, the extending arm 146 and the function module rotating shaft 132 may be fixed by welding, locking, or the like.

In the present embodiment, the driving wire 144 bypasses the driven wheel 145 and both ends thereof are respectively fixed to the first body rotating shaft 114 and the extending arm 146. The driving wire 144 includes the first segment 1441 between the first body rotating shaft 114 and the driven wheel 145 and the second segment 1442 between the driven wheel 145 and the extending arm 146, and the extending direction of the first segment 1441 is different from the extending direction of the second segment 1442.

As can be seen from FIG. 10, in the present embodiment, the extending arm 146 is closer to the second body 120 than the function module rotating shaft 132, and the driven wheel 145 is located under the extending arm 146. Certainly, in other embodiments, the extending arm 146 may also be further away from the second body 120 than the function module rotating shaft 132, and the driven wheel 145 is located above the extending arm 146. The relative positions of the extending arm 146, the function module rotating shaft 132, and the driven wheel 145 are not limited thereto.

As shown in FIG. 11, when the first body rotating shaft 114 is flipped over in the first clock direction, the driving wire 144 pulls the extending arm 146, such that the function module 130 is rotated around the function module rotating shaft 132 in the second clock direction. In this way, when the first body 110 is flipped over to the first angle θ1 relative to the second body 120 in the first clock direction, the function module 130 can be driven by the driving module 140a to be flipped over to the second angle θ2 relative to the second body 120 in the second clock direction, thereby accommodating the needs of different states of use.

It should be noted that, in the embodiment, when the first body rotating shaft 114 is flipped over in the first clock direction, the length of the driving wire 144 wound on the first body rotating shaft 114 as the first body rotating shaft 114 rotates is equal to the distance that the extending arm 146 is pulled from the original position P1 to the flipping position P2. The designer may adjust the diameter (related to how long the driving wire 144 is wound on the first body rotating shaft 114 when the first body rotating shaft 114 is rotated to the first angle θ1) of the first body rotating shaft 114, the distance (related to the radius of rotation of the extending arm 146) between the extending arm 146 and the function module rotating shaft 132 to adjust the angle at which the function module 130 is flipped over from the original position P1 to the flipping position P2.

More specifically, if it is desired to make the second angle θ2 to be much smaller than the first angle θ1, the designer may reduce the diameter of the first body rotating shaft 114, and make less of the driving wire 144 to be wound on the first body rotating shaft 114 when the first body rotating shaft 114 is rotated to the first angle θ1. In this manner, the distance that the extending arm 146 is pulled from the original position P1 to the flipping position P2 is reduced, so that the function module 130 is flipped over less. Alternatively, the designer may increase the distance between the extending arm 146 and the function module rotating shaft 132 to increase the radius of rotation of the extending arm 146. On the premise that the extending arm 146 is pulled by the same distance (arc length), the extending arm 146 with larger radius is rotated by a smaller angle.

Figure 12:
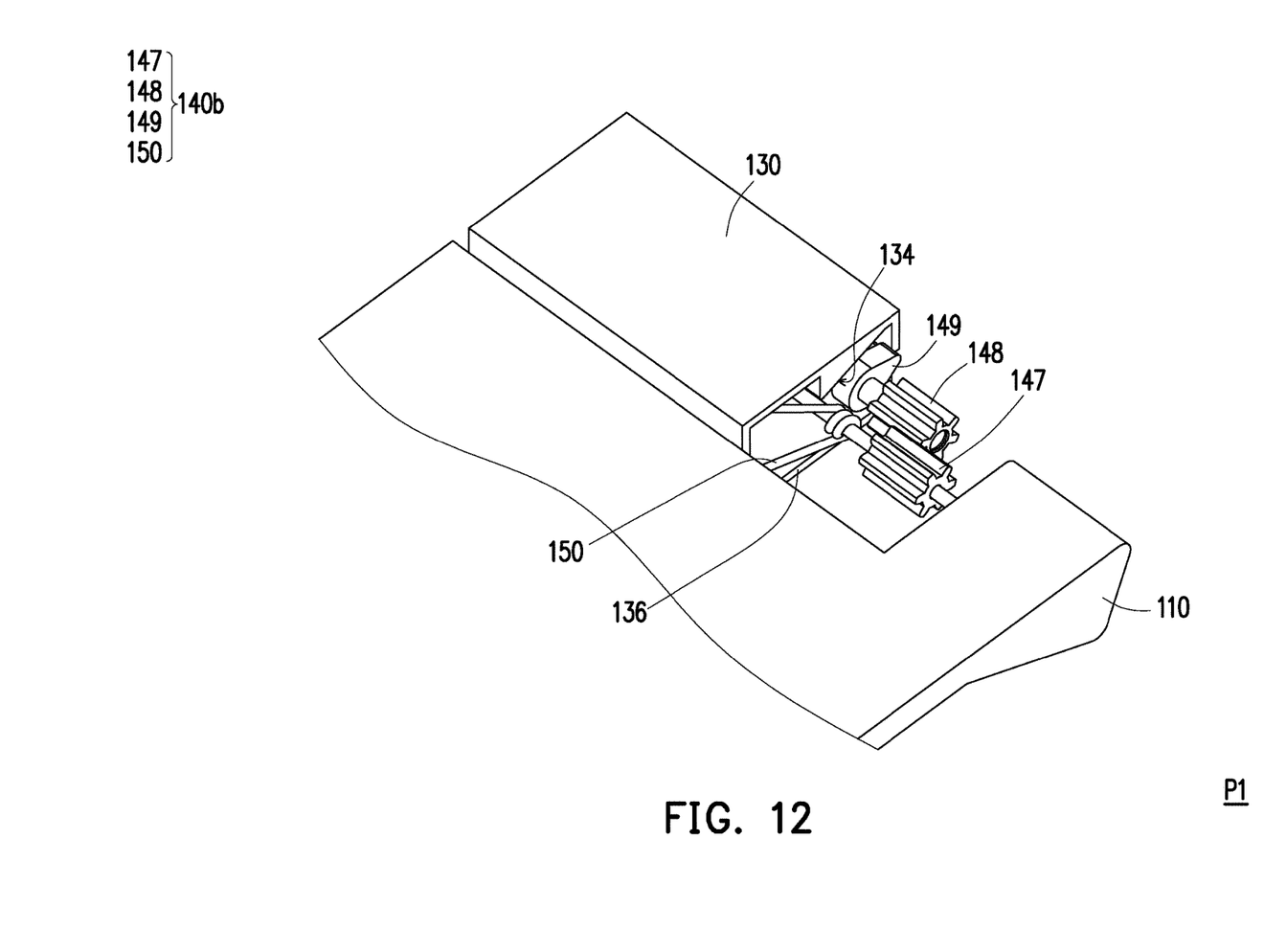
FIG. 12 is a schematic partial view of an electronic device at an original position according to a third embodiment of the present disclosure.
Figure 13:
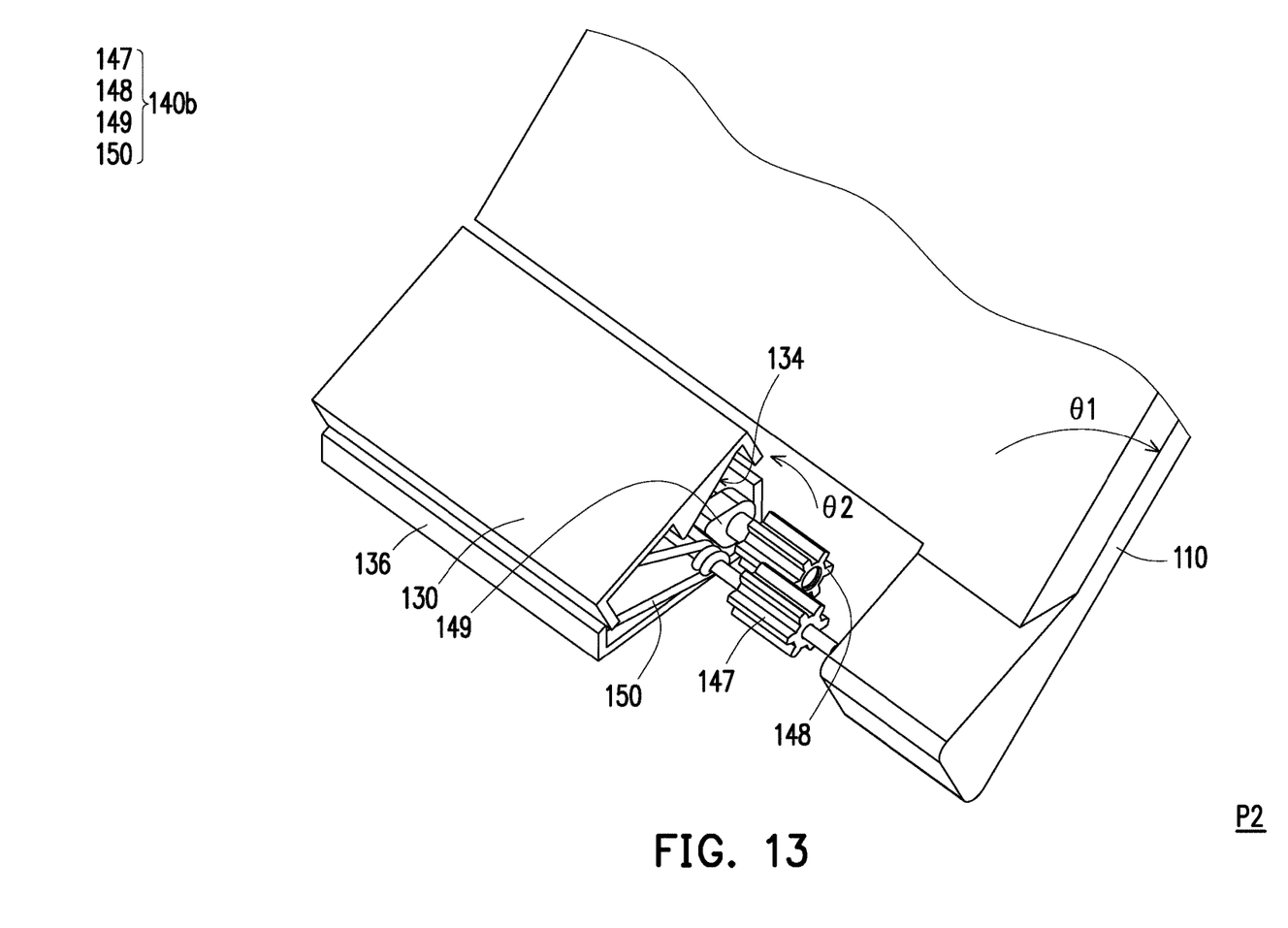
FIG. 13 is a schematic partial view of the electronic device of FIG. 12 at a flipping position.

FIG. 12 is a schematic partial view of an electronic device at an original position according to a third embodiment of the present disclosure. FIG. 13 is a schematic partial view of the electronic device of FIG. 12 at a flipping position. Referring to FIG. 12 and FIG. 13, in the embodiment, the driving module 140b includes a first gear 147 fixed to the first body rotating shaft, a second gear 148 engaged with the first gear 147, and a cam 149 fixed to the second gear 148. In the present embodiment, the function module 130 includes an inner inclined surface 134, and the cam 149 abuts against the inner inclined surface 134. As shown in FIG. 13, when the first body 110 is flipped over relative to the second body 120 in the first clock direction, the first gear 147 is rotated along with the first body 110 to drive the second gear 148, and the cam 149 is rotated along with the second gear 148 to push the inner inclined surface 134 of the function module 130, such that the function module 130 is rotated in the second clock direction.

In addition, in the embodiment, the driving module 140b further includes a torsion spring 150 connected between the function module 130 and the function module base 136. When the first body 110 is flipped over relative to the second body 120 in the first clock direction, the torsion spring 150 accumulates the elastic force. When the first body 110 returns to the original position P1, the cam 149 does not abut against the inner inclined surface 134 of the function module 130, and the torsion spring 150 can bring the function module 130 back to the original position as shown in FIG. 12. Certainly, in an embodiment, the torsion spring 150 may be replaced with other resilient members or structures to bring the function module 130 back to the original place. In an embodiment, the driving module 140b may also omit the torsion spring 150, and the user only needs to manually press the function module 130 back to the original position.

In summary, the function module of the electronic device of the present disclosure is pivoted to the first body and located between the first body and the second body, and the driving module is at least disposed at the first body and the function module. When the first body is closed to the second body, the function module is exposed from the first body. When the first body is flipped over in the first clock direction, the function module is driven by the driving module to be flipped over by a smaller angle in the second clock direction, so that the function module is adapted to face the user. That is to say, the function module exhibits an exposed state regardless of whether the first body of the electronic device of the present disclosure is closed to or is flipped over from the second body, which enables the function module to perform functions well.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. An electronic device, comprising:
 a first body;
 a second body, pivoted to the first body;
 a function module, pivoted to the first body and located between the first body and the second body; and
 a driving module, at least disposed at the first body and the function module, wherein
 when the first body is closed to the second body, the function module is located at an original position relative to the second body, and the function module is exposed from the first body,
 when the first body is flipped over to a first angle relative to the second body in a first clock direction, the function module is driven by the driving module to flip over to a second angle relative to the second body in a second clock direction, and the first angle is greater than the second angle.

2. The electronic device according to claim 1, wherein the driving module comprises a first magnetic member, a second magnetic member and a third magnetic member, wherein the first magnetic member is disposed on the first body, the second magnetic member is disposed on the function module, and the third magnetic member is disposed on the second body, when the first body is closed to the second body, the second magnetic member is attracted by the first magnetic member, causing the function module to stay at the original position, when the first body is flipped over relative to the second body, the first magnetic member is away from the second magnetic member, and the second magnetic member is attracted by the third magnetic member to make the function module rotate.

3. The electronic device according to claim 1, wherein the function module comprises a function module rotating shaft, the first body comprises a first body rotating shaft, and the function module rotating shaft is coaxial with the first body rotating shaft.

4. The electronic device according to claim 3, wherein the driving module comprises a driving wire, a driven wheel and an extending arm, the extending arm is fixed to the function module and is in different axis than the function module rotating shaft, the driving wire bypasses the driven wheel and both ends thereof are respectively fixed to the first body rotating shaft and the extending arm, the driving wire comprises a first segment between the first body rotating shaft and the driven wheel and a second segment between the driven wheel and the extending arm, an extending direction of the first segment is different from an extending direction of the second segment, and when the first body rotating shaft is flipped over in the first clock direction, the driving wire pulls the extending arm, such that the function module is rotated around the function module rotating shaft in the second clock direction.

5. The electronic device according to claim 4, wherein the extending arm is integral with the function module rotating shaft, and the extending arm is parallel with the function module rotating shaft.

6. The electronic device according to claim 4, wherein the extending arm is closer to the second body than the function module rotating shaft, and the driven wheel is located under the extending arm.

7. The electronic device according to claim 3, wherein the driving module comprises a first gear fixed to the first body rotating shaft, a second gear engaged with the first gear, and a cam fixed to the second gear, the function module comprises an inner inclined surface, the cam abuts against the inner inclined surface, and when the first body is flipped over relative to the second body in the first clock direction, the cam is rotated and pushes the inner inclined surface, such that the function module is rotated in the second clock direction.

8. The electronic device according to claim 7, further comprising:
   a function module base, located between the first body and the second body, the function module is rotatably disposed on the function module base, and the driving module further comprises a torsion spring connected between the function module and the function module base.

9. The electronic device according to claim 1, further comprising:
   a function module base, located next to the second body and fixed to the second body, wherein the function module base comprises a plurality of heat dissipation holes, and the function module is rotatably disposed on the function module base, when the function module is at the original position, the function module covers at least some of the heat dissipation holes, and when the function module is rotated to the second angle in the second clock direction, the function module exposes the heat dissipation holes.

10. The electronic device according to claim 1, wherein the first body comprises a notch on a side close to a first body rotating shaft, the function module is located in the notch, and the function module is conformal to the notch.

11. The electronic device according to claim 1, wherein when the first body is closed to the second body, the function module is flush with an outer surface of the first body.

12. The electronic device according to claim 1, wherein the function module comprises at least one of a speaker, a display, an input device, and a sound receiver.

13. The electronic device according to claim 1, wherein the first angle is between 120 degrees and 150 degrees and the second angle is between 15 degrees and 35 degrees.

* * * * *